United States Patent [19]

Shawcross

[11] Patent Number: 4,690,547
[45] Date of Patent: Sep. 1, 1987

[54] EXPOSING FRAME

[75] Inventor: Brian E. Shawcross, Cheadle Hulme, England

[73] Assignee: CIBA-GEIGY AG, Basel, Switzerland

[21] Appl. No.: 908,138

[22] Filed: Sep. 17, 1986

[30] Foreign Application Priority Data

Sep. 20, 1985 [GB] United Kingdom ............... 8523300

[51] Int. Cl.⁴ ............................................. G03B 27/58
[52] U.S. Cl. ......................................... 355/72; 355/75
[58] Field of Search ................................... 355/72, 75

[56] References Cited

U.S. PATENT DOCUMENTS

| | | | |
|---|---|---|---|
| 1,973,827 | 9/1934 | Shwartz | 355/75 |
| 2,824,491 | 2/1958 | Hoffmaster | 355/75 |
| 2,959,096 | 11/1960 | Bobeck et al. | 355/75 |
| 3,051,039 | 8/1962 | Wight | 355/72 |
| 3,288,027 | 11/1966 | Ruzicka | 355/75 |
| 3,469,917 | 9/1969 | Pignone | 355/72 |

*Primary Examiner*—Monroe H. Hayes
*Attorney, Agent, or Firm*—Harry Falber

[57] ABSTRACT

A device for holding photosensitive material during light exposure which comprises two planar frames of equal size, each of which has two parallel walls and rounded corners, one frame at least being open between its four walls, each frame carrying around its peripheral walls a band of resilient material of rounded cross-section which when the device is in the non-use state is so mounted that part of the band is held above walls of the frame, the sides of each frame being bevelled outwards, together with means to hold in position the two frames separated from each other with the bands of resilient material facing each other, means to force the two frames together so that the bands contact each other substantially over their entire length and force each other down the walls of each frame and means to hold securely the two frames in this position.

The device is of particular use for exposing holographic film material.

5 Claims, 4 Drawing Figures

EXPOSING FRAME

This invention relates to a device for holding photosensitive material flat during light exposure.

It is important that photosensitive material such as photographic film material in sheet form, photographic paper and holographic material should be held as flat as possible during the time it is being light exposed.

This requirement to hold the photosensitive material flat is particularly important when holographic material is being exposed. A further requirement when exposing holographic material is that the exposing light must be able to pass through the material without being reflected back either by an opaque photosensitive material base or by a solid platform on which the photosensitive material is laid and secured flat during the exposure. Securing holographic material to a transparent glass plate is not satisfactory as the surface of the glass plate tends to reflect back too much exposing light. Also in one form of holographic exposure the reference beam of the exposing light exposes the holographic material from one side of the material and the object beam of the exposing light exposes the holographic material from the other side.

Various devices have been proposed in the past for holding photographic material flat during an exposure. For example holders for strips of negative film are described in German laid-open patent specification No. 1012520, in British patent specification No. 1173473 and in German laid-open patent specification No. 124453-4. In Swiss patent specification No. 457140 a spring with feet at each corner is used to press a positive with a opaque base to render it flat in an exposure frame. In U.S. Pat. No. 2,959,096 a photographic negative carrier of a frame type is described. The film is gripped between pairs of gripping pins. When the film is firmly gripped a forward movement of two sections of the frame is said to stretch the film to free it of wrinkles.

It is the object of the present invention to provide a device in which photosensitive material is held very flat during light exposure.

According to the present invention there is provided a device for holding photosensitive material during light exposure which comprises two planar frames of equal size, each of which has two parallel side walls and rounded corners, one frame at least being open between its four walls, each frame carrying around its peripheral walls a band of resilient material of rounded cross-section which when the device is in the non-use state is so mounted that part of the band is held above walls of the frame, the sides of each frame being bevelled outwards, together with means to hold in one position the two frames separated from each other with the bands of resilient material facing each other, means to force the two frames together so that the bands contact each other substantially over their entire length and force each other down the walls of each frame and means to hold securely the two frames in this position.

When the device is to be used to expose holographic material both frames should be open between their walls.

In operation a sheet of photosensitive material is laid flat on one frame when the device is in the position when the two frames are separated. The two frames are then forced together trapping the photosensitive material between the resilient material band on each frame. Each band is forced down the side wall on which it is mounted. This causes each band to expand. This acts to stretch sideways in every direction the photosensitive material held between the frames. Thus the photosensitive material is held very flat and very securely between the two frames.

Preferably when the two frames are held separated in the device they are parallel to each other. This is to ensure that when a sheet of photosensitive material is held on one frame it is not disturbed when the second frame is forced down onto it.

Preferably the band of resilient material is of circular cross-section. Suitable materials for the band include rubber and neoprene.

Preferably each band is secured to its supporting frame by a soft material strap at each rounded corner.

Preferably means are provided for ensuring tht the two frames fit exactly over each other when the two frames are forced together.

The accompanying drawings will serve to illustrate the invention.

In all the drawings the same numbers have the same signification.

Figure 1:
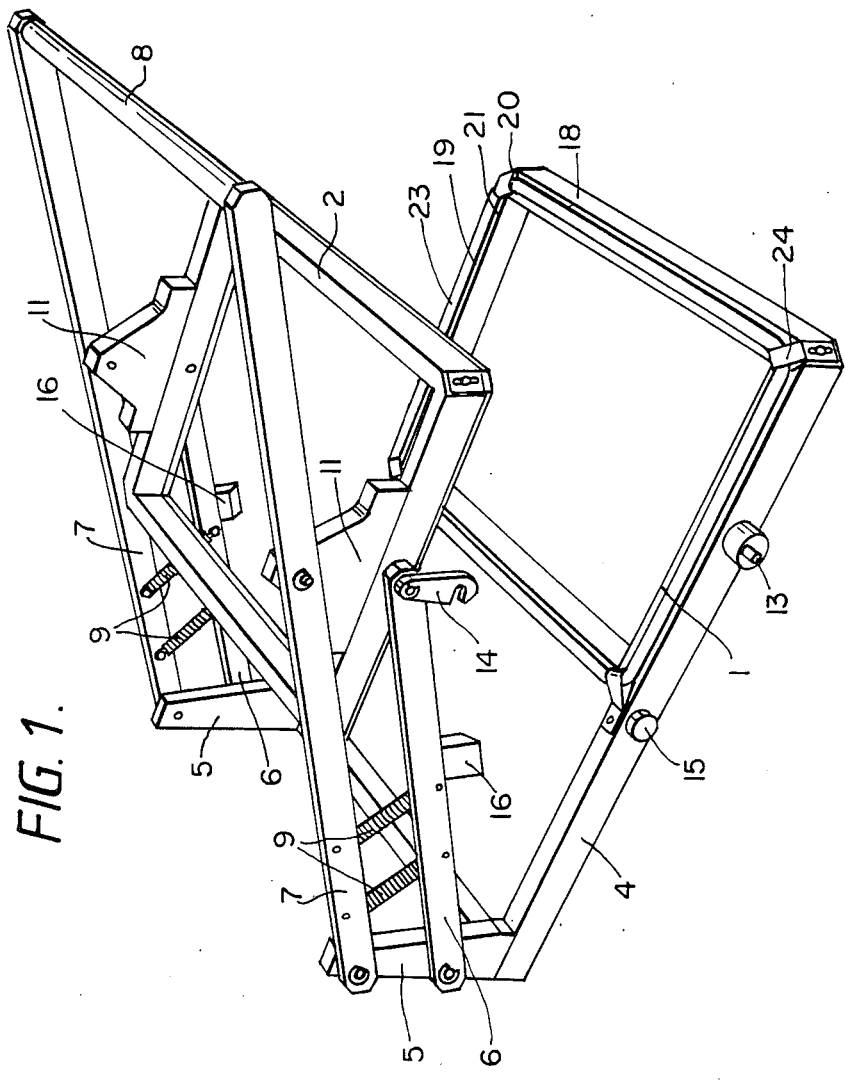
FIG. 1 is a perspective view of a device according to the present invention with the two frames separated.

In the drawings the device comprises two frames 1 and 2 supported on a frame work. The frame work consists of a base 4, one end of which holds frame 1. Two upright members 5 have pivotably connected to them two lower spars 6 and two upper spars 7. The two upper spars 7 are joined to form a handle 8.

Spars 6 and 7 are urged together by spring means 9.

Frame 2 is directly connected to spars 6 whilst joining pieces 11 join frame 2 to spars 7.

Base 4 comprises two rounded projections 13, one on each side below frame 1. The movable hooked members 14 on spars 6 fit over these projections to hold the two frames together as shown in FIG. 2.

Base 4 also comprises two plastics material discs 15 mounted on opposite side of the base.

Figure 2:
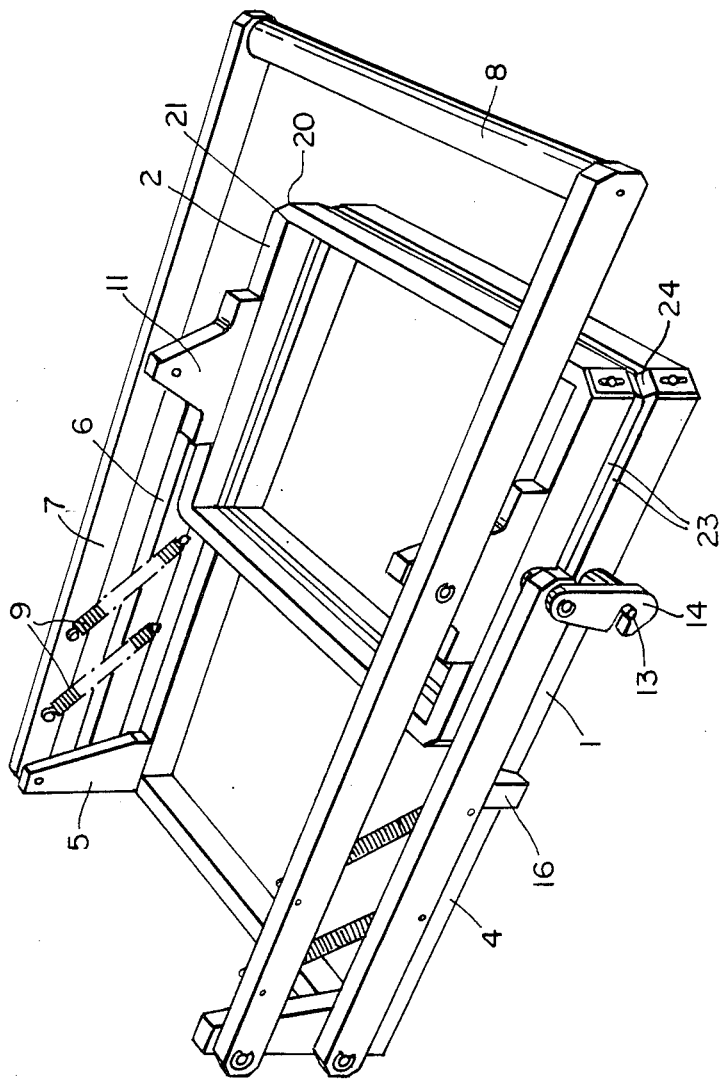
FIG. 2 is the same perspective view of the device as in FIG. 1 with the frames held in contact.

Two abutment members 16 mounted on spars 6 fit closely over these discs 15 when the frames are forced together as shown in FIG. 2. These abutment members and discs ensure that frame 2 fits exactly over frame 1 when the frames are forced together.

Figure 3:
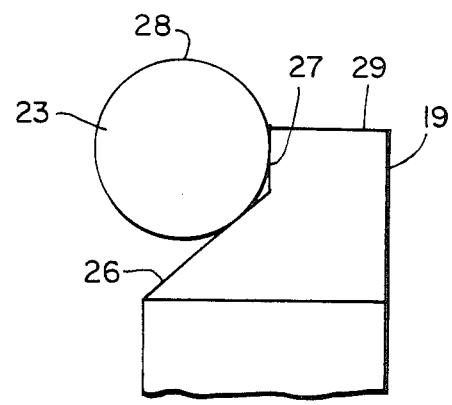
FIG. 3 is a cross-sectional view of part of one frame.
Figure 4:
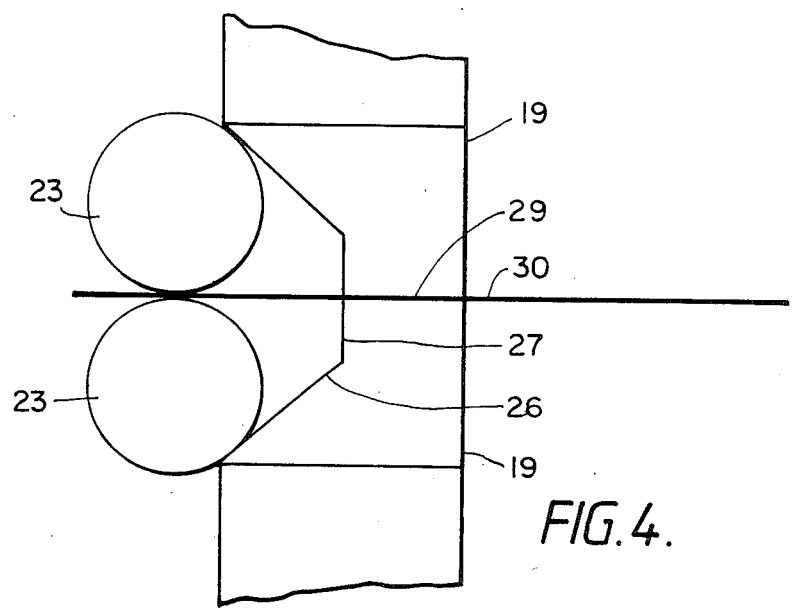
FIG. 4 is a cross-sectional view of part of both frames when in contact with a sheet of photosensitive material sandwiched between them.

Each frame 1 and 2 has mounted on parallel side walls 18 raised side walls 19 which constitute the actual exposure frame and which are bevelled outwards as shown in FIGS. 3 and 4. These raised side walls have rounded outer corners 20 but square inner corners 21 as shown in FIG. 1. Thus the exposure frame is rectangular in both frames 1 and 2.

Mounted around the raised side walls 19 of each frame 1 and 2 is a band of resilient material 23. Each band 23 is of circular cross section.

Each band 23 is secured to its respective frame by cloth straps 24.

In FIG. 3 is shown a cross-section through frame 1.

The raised side walls 19 are shown with their outer walls 26 bevelled outwards. Mounted on a flat section 27 above the bevelled part is the band 23. The top part 28 of the band 23 is shown raised above the top 29 of raised side wall 19.

FIG. 4 shows the position of bands 23 when frames 1 and 2 are locked together. A sheet 30 of photosensitive material is shown sandwiched between the two bands 23.

Each band 23 is shown forced down onto the bevelled outer side wall 26. This riding down of the bands 23 has expanded the bands.

In operation the device is opened to separate the frames 1 and 2. A sheet of photosensitive material is laid on the band 23 of frame 1.

The handle 8 is pulled downwards and this forces the frame 2 down against the force exerted by the springs 9 so that a controlled lowering of frame 2 onto frame 1 is achieved. As frame 2 is lowered the abutment members 16 slide down over the faces of discs 15 so ensuring that frame 2 is in exact register over frame 1. When frame 2 has been fully lowered onto frame 1 the hooked members 14 are hooked over the projection 13 thus securing the two frames together.

The act of forcing the frames into contact and then hooking members 14 over projections 13 forces the two frames very firmly together so that the bands 23 slide down the bevelled outwards side walls 26. This enlarges the bands 23. This enlargement causes the sheet of photosensitive material 30 to be stretched cut in every direction whilst still being clamped between the bands. This achieves a very flat very secure presentation of the sheet 30 for an imagewise exposure.

The device shown in FIGS. 1 to 4 after the sheet 30 has been loaded therein may be installed in an exposure station to expose sheet 30. Alternatively the device may be part of an exposure station and the sheet 30 loaded into the device whilst it is present in the exposure station.

I claim:

1. A device for holding photosensitive material during light exposure which comprises two planar frames of equal size, each of which has two parallel walls and rounded corners, one frame at least being open between its four walls, each frame carrying around its peripheral walls a band of resilient material of rounded cross-section which when the device is in the non-use state is so mounted that part of the band is held above walls of the frame, the sides of each frame being bevelled outwards, together with means to hold in position the two frames separated from each other with the bands of resilient material facing each other, means to force the two frames together so that the bands contact each other substantially over their entire length and force each other down the walls of each frame and means to hold securely the two frames in this position.

2. A device according to claim 1 wherein when the two frames are held separated in the device they are parallel to each other.

3. A device according to either claim 1 wherein the band of resilient material is of circular cross-section.

4. A device according to claim 1 wherein each band is secured to its supporting frame by a soft material strap at each rounded corner.

5. A device according to claim 1 wherein means are provided for ensuring that the two frames fit exactly over each other when the two frames are forced together.

* * * * *